United States Patent
He et al.

(10) Patent No.: US 12,046,072 B2
(45) Date of Patent: Jul. 23, 2024

(54) CAMERA SYNCHRONIZATION AND IMAGE TAGGING FOR FACE AUTHENTICATION

(71) Applicant: Google LLC, Mountain View, CA (US)

(72) Inventors: Zhijun He, Mountain View, CA (US); Wen Yu Chien, Taipei (TW); Po-Jen Chang, Taichung (TW); Xu Han, Mountain View, CA (US); Adarsh Prakash Murthy Kowdle, San Francisco, CA (US); Jae Min Purvis, San Jose, CA (US); Lu Gao, Los Altos, CA (US); Gopal Parupudi, Sunnyvale, CA (US); Clayton Merrill Kimber, San Jose, CA (US)

(73) Assignee: Google LLC, Mountain View, CA (US)

( * ) Notice: Subject to any disclaimer, the term of this patent is extended or adjusted under 35 U.S.C. 154(b) by 54 days.

(21) Appl. No.: 17/437,395

(22) PCT Filed: Oct. 10, 2019

(86) PCT No.: PCT/US2019/055669
§ 371 (c)(1),
(2) Date: Sep. 8, 2021

(87) PCT Pub. No.: WO2021/071497
PCT Pub. Date: Apr. 15, 2021

(65) Prior Publication Data
US 2022/0172511 A1 Jun. 2, 2022

(51) Int. Cl.
*G06V 40/16* (2022.01)
*G06V 10/10* (2022.01)
(Continued)

(52) U.S. Cl.
CPC ............ *G06V 40/166* (2022.01); *G06V 10/10* (2022.01); *G06V 40/16* (2022.01); *G06V 40/172* (2022.01);
(Continued)

(58) Field of Classification Search
None
See application file for complete search history.

(56) References Cited

U.S. PATENT DOCUMENTS

| 7,099,056 B1 | 8/2006 | Kindt |
| 7,315,631 B1 * | 1/2008 | Corcoran ............ G06F 18/2148 |
| | | 382/118 |

(Continued)

FOREIGN PATENT DOCUMENTS

| CN | 101202841 | 6/2008 |
| CN | 101782928 A | 7/2010 |

(Continued)

OTHER PUBLICATIONS

"A Review of Multimodal Facial Biometric Authentication Methods in Mobile Devices and their Application in Head Mounted Displays", 2018 IEEE SmartWorld, Ubiquitous Intelligence & Computing, Advanced & Trusted Computing, Scalable Computing & Communications, Cloud & Big Data Computing, Internet of People and Smart City Innovations, 2018, 8 pages.

(Continued)

*Primary Examiner* — Reza Aghevli
(74) *Attorney, Agent, or Firm* — Colby Nipper PLLC

(57) ABSTRACT

This disclosure describes systems and techniques for synchronizing cameras and tagging images for face authentication. For face authentication by a facial recognition model, a dual infrared camera may generate an image stream by alternating between capturing a "flood image" and a "dot image" and tagging each image with metadata that indicates (Continued)

whether the image is a flood or a dot image. Accurately tagging images can be difficult due to dropped frames and errors in metadata tags. The disclosed systems and techniques provide for the improved synchronization of cameras and tagging of images to promote accurate facial recognition.

19 Claims, 6 Drawing Sheets

(51) Int. Cl.
    *G06V 40/00* (2022.01)
    *H04N 5/04* (2006.01)
    *H04N 23/56* (2023.01)
    *H04N 23/66* (2023.01)

(52) U.S. Cl.
    CPC ............ *G06V 40/179* (2022.01); *H04N 5/04* (2013.01); *H04N 23/56* (2023.01); *H04N 23/66* (2023.01)

(56) References Cited

U.S. PATENT DOCUMENTS

| | | | |
|---|---|---|---|
| 7,542,628 B2 | 6/2009 | Lolacono et al. | |
| 8,330,831 B2* | 12/2012 | Steinberg | G06V 10/28 |
| | | | 348/231.3 |
| 8,483,479 B2 | 7/2013 | Kunkel et al. | |
| 8,798,378 B1 | 8/2014 | Babenko et al. | |
| 8,890,975 B2 | 11/2014 | Baba et al. | |
| 8,982,238 B2 | 3/2015 | Liu et al. | |
| 9,253,412 B2 | 2/2016 | Lee | |
| 9,286,509 B1 | 3/2016 | Rodriguez | |
| 9,491,452 B2 | 11/2016 | Meloun et al. | |
| 9,609,197 B1* | 3/2017 | Stepanenko | H04N 23/661 |
| 9,619,633 B1 | 4/2017 | Mortensen | |
| 9,686,475 B2 | 6/2017 | Neglur | |
| 9,774,780 B1 | 9/2017 | Baldwin et al. | |
| 9,774,798 B1 | 9/2017 | Evans, V et al. | |
| 10,015,408 B2 | 7/2018 | Shabtay et al. | |
| 10,521,952 B2 | 12/2019 | Ackerson et al. | |
| 11,257,226 B1* | 2/2022 | Solh | G06F 18/22 |
| 11,352,812 B2* | 6/2022 | Johnson | G07C 9/00904 |
| 11,687,635 B2 | 6/2023 | Kowdle et al. | |
| 11,734,820 B2* | 8/2023 | Oosake | G06T 7/70 |
| | | | 382/128 |
| 2003/0068100 A1 | 4/2003 | Covell et al. | |
| 2003/0103652 A1 | 6/2003 | Lee et al. | |
| 2005/0099494 A1 | 5/2005 | Deng et al. | |
| 2005/0147278 A1* | 7/2005 | Rui | G06T 7/251 |
| | | | 382/118 |
| 2005/0265626 A1 | 12/2005 | Endo et al. | |
| 2006/0104488 A1* | 5/2006 | Bazakos | G06V 40/166 |
| | | | 382/118 |
| 2007/0025714 A1 | 2/2007 | Shiraki | |
| 2007/0052839 A1 | 3/2007 | Kong et al. | |
| 2007/0216777 A1 | 9/2007 | Quan et al. | |
| 2009/0207266 A1 | 8/2009 | Yoda | |
| 2009/0303342 A1* | 12/2009 | Corcoran | H04N 23/635 |
| | | | 348/222.1 |
| 2009/0303343 A1 | 12/2009 | Drimbarean et al. | |
| 2010/0048242 A1* | 2/2010 | Rhoads | G06V 10/56 |
| | | | 455/556.1 |
| 2011/0034176 A1* | 2/2011 | Lord | G06F 16/50 |
| | | | 348/241 |
| 2011/0090303 A1 | 4/2011 | Wu et al. | |
| 2011/0143811 A1* | 6/2011 | Rodriguez | H04N 1/00244 |
| | | | 455/556.1 |
| 2011/0212717 A1* | 9/2011 | Rhoads | G06V 10/24 |
| | | | 455/418 |
| 2011/0261217 A1 | 10/2011 | Muukki et al. | |
| 2011/0267499 A1 | 11/2011 | Wan et al. | |
| 2012/0002074 A1 | 1/2012 | Baba et al. | |
| 2012/0050570 A1 | 3/2012 | Jasinski et al. | |
| 2012/0051635 A1 | 3/2012 | Kunkel et al. | |
| 2012/0154579 A1 | 6/2012 | Hampapur et al. | |
| 2012/0162478 A1 | 6/2012 | Lee | |
| 2012/0307096 A1 | 12/2012 | Ford et al. | |
| 2013/0147923 A1 | 6/2013 | Zhou et al. | |
| 2013/0177203 A1 | 7/2013 | Koo et al. | |
| 2013/0242129 A1 | 9/2013 | Harmelling et al. | |
| 2013/0314558 A1 | 11/2013 | Ju et al. | |
| 2013/0342731 A1 | 12/2013 | Lee et al. | |
| 2014/0009639 A1 | 1/2014 | Lee | |
| 2014/0080428 A1* | 3/2014 | Rhoads | H04W 4/70 |
| | | | 455/88 |
| 2014/0192247 A1 | 7/2014 | Cheong et al. | |
| 2015/0033305 A1 | 1/2015 | Shear et al. | |
| 2015/0156388 A1 | 6/2015 | Neglur | |
| 2015/0334292 A1 | 11/2015 | Tartz et al. | |
| 2015/0348580 A1 | 12/2015 | Van Hoff et al. | |
| 2016/0112637 A1 | 4/2016 | Laroia et al. | |
| 2016/0117798 A1 | 4/2016 | Lin et al. | |
| 2016/0163029 A1 | 6/2016 | Gibbon et al. | |
| 2016/0234023 A1 | 8/2016 | Mozer et al. | |
| 2016/0248979 A1 | 8/2016 | Israel et al. | |
| 2016/0283789 A1 | 9/2016 | Slaby et al. | |
| 2016/0309065 A1 | 10/2016 | Karafin et al. | |
| 2016/0337570 A1 | 11/2016 | Tan et al. | |
| 2017/0053167 A1 | 2/2017 | Ren et al. | |
| 2017/0116932 A1 | 4/2017 | Musgrave et al. | |
| 2017/0213112 A1 | 7/2017 | Sachs et al. | |
| 2017/0351932 A1 | 12/2017 | Uliyar et al. | |
| 2018/0077210 A1 | 3/2018 | Hannuksela et al. | |
| 2018/0181737 A1* | 6/2018 | Tussy | G06V 40/18 |
| 2018/0249142 A1 | 8/2018 | Hicks et al. | |
| 2018/0336399 A1 | 11/2018 | Gernoth et al. | |
| 2018/0367681 A1 | 12/2018 | Xu et al. | |
| 2019/0042718 A1 | 2/2019 | Prakash et al. | |
| 2019/0042835 A1* | 2/2019 | Mostafa | G06F 21/32 |
| 2019/0130166 A1 | 5/2019 | Wang | |
| 2019/0130630 A1 | 5/2019 | Ackerson et al. | |
| 2019/0132520 A1 | 5/2019 | Gupta et al. | |
| 2019/0138793 A1 | 5/2019 | Rodriguez | |
| 2019/0171908 A1 | 6/2019 | Salavon | |
| 2019/0208115 A1 | 7/2019 | Paul | |
| 2019/0259360 A1 | 8/2019 | Yoelin | |
| 2020/0053262 A1* | 2/2020 | Wexler | G06V 20/30 |
| 2020/0105291 A1 | 4/2020 | Sheaffer et al. | |
| 2020/0128203 A1 | 4/2020 | Hirono et al. | |
| 2020/0151964 A1 | 5/2020 | Chen et al. | |
| 2020/0184278 A1* | 6/2020 | Zadeh | G06N 3/044 |
| 2020/0225673 A1* | 7/2020 | Ebrahimi Afrouzi | |
| | | | G05D 1/0044 |
| 2020/0236466 A1 | 7/2020 | Zhao et al. | |
| 2020/0320297 A1* | 10/2020 | Ahn | B25J 13/08 |
| 2020/0349249 A1* | 11/2020 | Weston | G06V 40/171 |
| 2020/0349345 A1* | 11/2020 | Hodge | G06V 20/59 |
| 2020/0349376 A1* | 11/2020 | Raveendran | G06V 40/172 |
| 2021/0001862 A1* | 1/2021 | Senechal | G06N 20/00 |
| 2021/0248782 A1 | 8/2021 | Chang et al. | |
| 2021/0329150 A1 | 10/2021 | Wang et al. | |
| 2022/0100831 A1 | 3/2022 | Moreno et al. | |
| 2022/0121884 A1* | 4/2022 | Zadeh | G06V 10/764 |
| 2022/0191374 A1 | 6/2022 | Kowdle et al. | |
| 2022/0319219 A1* | 10/2022 | Tsibulevskiy | G06T 3/60 |
| 2022/0382840 A1* | 12/2022 | Weston | G06V 40/30 |

FOREIGN PATENT DOCUMENTS

| | | |
|---|---|---|
| CN | 103702015 | 4/2014 |
| CN | 106446873 | 2/2017 |
| CN | 107302663 | 10/2017 |
| CN | 107734129 | 2/2018 |
| CN | 108780477 | 11/2018 |
| CN | 108965721 A | 12/2018 |
| CN | 109145653 | 1/2019 |
| CN | 109325327 | 2/2019 |
| CN | 109325328 A | 2/2019 |
| CN | 109587303 A | 4/2019 |
| CN | 109697419 A | 4/2019 |
| CN | 209419666 U | 9/2019 |

(56) References Cited

FOREIGN PATENT DOCUMENTS

| | | |
|---|---|---|
| CN | 110298874 A | 10/2019 |
| CN | 110312056 A | 10/2019 |
| CN | 111738230 | 10/2020 |
| CN | 107636685 B | 2/2022 |
| JP | 2013152643 | 8/2013 |
| WO | 2005096213 | 10/2005 |
| WO | 2018005073 | 1/2018 |
| WO | 2018188535 | 10/2018 |
| WO | 2018198690 | 11/2018 |
| WO | 2019027503 | 2/2019 |
| WO | 2021050042 | 3/2021 |
| WO | 2021061112 | 4/2021 |
| WO | 2021066839 | 4/2021 |
| WO | 2021071497 | 4/2021 |

OTHER PUBLICATIONS

"AudioCapture—Premium Audio Experience for Your Video Recordings", Retrieved at: https://product.goodix.com/en/product/audioa_capture—on Mar. 8, 2021, 2 pages.

"Foreign Office Action", EP Application No. 19797409.0, Jul. 16, 2021, 4 pages.

"International Search Report and Written Opinion", Application No. PCT/US2019/052860, Jul. 20, 2020, 27 pages.

"International Search Report and Written Opinion", PCT Application No. PCT/US2019/054712, Jan. 10, 2020, 15 pages.

"International Search Report and Written Opinion", PCT Application No. PCT/US2019/050245, May 12, 2020, 42 pages.

"International Search Report and Written Opinion", PCT Application No. PCT/US2019/055669, May 28, 2020, 20 pages.

"Invitation to Pay Additional Fees", PCT Application No. PCT/US2019/052860, Jun. 2, 2020, 12 pages.

"Nokia OZO Audio", OZO.Nokia.com—Retrieved on Feb. 10, 2021, 2020, 16 pages.

"Notice of Allowance", U.S. Appl. No. 16/956,730, filed Jul. 9, 2021, 10 pages.

"PL-D Camera Synchronization Methods", Retrieved from the internet at https://support.pixelink.com/support/solutions/articles/3000085024-pl-d-camera-synchronization-methods, Aug. 1, 2019, 9 pages.

Chang, et al., "Low-light Image Restoration with Short-and-long-exposure Raw Pairs", Jul. 1, 2020, 12 pages.

Chang, "Measuring Stereo Camera Alignment Using Depth Map Smoothness", Technical Disclosure Commons; Retrieved from https://www.tdcommons.org/dpubs_series/2580, Oct. 17, 2019, 9 pages.

Chen, "Enhancing Image Quality of Photographs Taken by Portable Devices by Matching Images to High Quality Reference Images Using Machine Learning and Camera Orientation and Other Image Metadata", Technical Disclosure Commons; Retrieved from https://www.tdcommons.org/dpubs_series/2717, Nov. 25, 2019, 14 pages.

Cho, "Motion Blur Removal from Photographs", Massachusetts Institute of Technology, Sep. 2010, 143 pages.

Fried, et al., "Perspective-Aware Manipulation of Portrait Photos", SIGGRAPH '16 Technical Paper, Jul. 24-28, 2016, Anaheim, CA, 10 pages.

Gao, et al., "Camera Sensor Exposure Control During Camera Launch", Nov. 24, 2020, 7 pages.

Gao, et al., "Scene Metering and Exposure Control for Enhancing High Dynamic Range Imaging", Technical Disclosure Commons; Retrieved from https://www.tdcommons.org/dpubs_series/3092, Apr. 1, 2020, 12 pages.

Hahne, "Real-Time Depth Imaging", Retrieved from https://d-nb.info/1023762218/34, May 3, 2012, 108 pages.

Hong, et al., "Image Deblurring According to Facially Recognized Locations Within the Image", Technical Disclosure Commons, https://www.tdcommons.org/dpubs_series/4193, Mar. 26, 2021, 9 pages.

Hong, et al., "Method of Capturing a Video and a Set of Selected High-Quality Images During Camera Shutter Long-Press", Technical Disclosure Commons; Retrieved from https://www.tdcommons.org/dpubs_series/2757, Dec. 12, 2019, 10 pages.

Hong, et al., "Predictive Modeling Techniques for Adaptive Face Retouching", https://www.tdcommons.org/dpubs_series/4208, Apr. 5, 2021, 9 pages.

Jackson, "The Creative and Technical Differences Between Full Frame and S-35", Accessed from: https://vmi.tv/training/useful-stuff/differences-between-full-frame-and-s-35, Feb. 2020, 19 pages.

Jain, et al., "On Detecting GANs and Retouching Based Synthetic Alterations", Jan. 26, 2019, 7 pages.

Khoshelham, et al., "Accuracy and Resolution of Kinect Depth Data for Indoor Mapping Applications", Retrieved from https://www.researchgate.net/publication/221967616_Accuracy_and_Resolution_of_Kinect_Depth_Data_for_Indoor_Mapping_Applications, Feb. 1, 2012, 18 pages.

Li, "Scene-Aware Audio for 360° Videos", May 12, 2018, 12 pages.

Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.

Moraldo, "Virtual Camera Image Processing", Technical Disclosure Commons; Retrieved from https://www.tdcommons.org/dpubs_series/3072, Mar. 30, 2020, 10 pages.

Mustaniemi, et al., "LSD—Joint Denoising and Deblurring of Short and Long Exposure Images with CNNs", Sep. 1, 2020, 21 pages.

Portmann, et al., "Detection of Automated Facial Beautification by a Camera Application by Comparing a Face to a Rearranged Face", Technical Disclosure Commons, Retrieved from https://www.tdcommons.org/dpubs_series/2943, Feb. 9, 2020, 11 pages.

Shih, et al., "Techniques for Deblurring Faces in Images by Utilizing Multi-Camera Fusion", Technical Disclosure Commons—https://www.tdcommons.org/dpubs_series/4274, May 5, 2021, 9 pages.

Talvala, et al., "Techniques and Apparatuses for Variable-Display Devices to Capture Screen-Fitting Images with a Maximized Field of View", Technical Disclosure Commons; Retrieved from https://www.tdcommons.org/dpubs_series/3388, Jun. 29, 2020, 8 pages.

Tillman, "What is Apple Face ID and How Does it Work?", Retrieved from the internet at https://www.pocket-lint.com/phones/news/apple/142207-what-is-apple-face-id-and-how-does-it-work on May 13, 2020, Sep. 18, 2019, 10 pages.

Xompero, et al., "Multi-camera Matching of Spatio-Temporal Binary Features", 2018 21st International Conference on Information Fusion (Fusion), 2018, 8 pages.

Yang, et al., "Improved Object Detection in an Image by Correcting Regions with Distortion", Technical Disclosure Commons; Retrieved from https://www.tdcommons.org/dpubs_series/3090, Apr. 1, 2020, 8 pages.

Yang, et al., "Object Detection and Tracking with Post-Merge Motion Estimation", Technical Disclosure Commons, https://www.tdcommons.org/dpubs_series_4353, Jun. 8, 2021, 11 pages.

Yang, et al., "Using Image-Processing Settings to Determine an Optimal Operating Point for Object Detection on Imaging Devices", Technical Disclosure Commons; Retrieved from https://www.tdcommons.org/dpubs_series/2985, Mar. 4, 2020, 10 pages.

Yuan, et al., "Image Deblurring with Blurred/Noisy Image Pairs", Jul. 29, 2007, 10 pages.

Chen, et al., "Automatic Zoom Based on Image Saliency", Technical Disclosure Commons, https://www.tdcommons.org/dpubs_series/4640, Oct. 7, 2021, 11 pages.

"Foreign Office Action", CN Application No. 201980093777.8, Oct. 19, 2022, 20 pages.

"Foreign Office Action", CN Application No. 201980093736.9, Oct. 27, 2022, 20 pages.

"Non-Final Office Action", U.S. Appl. No. 17/439,762, filed Nov. 29, 2022, 7 pages.

"Notice of Allowance", U.S. Appl. No. 17/439,762, filed Mar. 8, 2023, 7 pages.

"Non-Final Office Action", U.S. Appl. No. 17/439,770, filed Oct. 13, 2023, 15 pages.

"Foreign Office Action", EP Application No. 19773633.3, Jun. 13, 2023, 8 pages.

(56) References Cited

OTHER PUBLICATIONS

"Improving Autofocus Speed in Macrophotography Applications", Technical Disclosure Commons—https://www.tdcommons.org/dpubs_series/5133, May 11, 2022, 9 pages.

"International Preliminary Report on Patentability", Application No. PCT/US2019/050245, Mar. 9, 2022, 10 pages.

"International Preliminary Report on Patentability", Application No. PCT/US2019/052860, Mar. 15, 2022, 19 pages.

"International Preliminary Report on Patentability", Application No. PCT/US2019/054712, Apr. 5, 2022, 10 pages.

"International Preliminary Report on Patentability", Application No. PCT/US2019/055669, Apr. 12, 2022, 13 pages.

"Real-Time Feedback to Improve Selfifies for Low-Vision Users", Technical Disclosure Commons—https://www.tdcommons.org/dpubs_series/5114, May 4, 2022, 10 pages.

"Reinforcement Learning—Wikipedia", Retrieved from: https://en.wikipedia.org/wiki/Reinforcement_learning—on May 11, 2022, 16 pages.

"Take motion photos & use Top Shot on your Pixel phone", Retrieved at: https://support.google.com/googlecamera/answer/9937175?hl=en—on Mar. 7, 2022, 3 pages.

Gordon, "How to Use HDR Mode When Taking Photos", Dec. 17, 2020, 13 pages.

Hasinoff, et al., "Burst photography for high dynamic range and low-light imaging on mobile cameras", Nov. 2016, 12 pages.

Hollister, "How to guarantee the iPhone 13 Pro's macro mode is on", Retrieved at: https://www.theverge.com/22745578/iphone-13-pro-macro-mode-how-to, Oct. 26, 2021, 11 pages.

Kains, et al., "Astrophotography with Night Sight on Pixel Phones", https://ai.googleblog.com/2019/11/astrophotography-with-night-sight-on.html, Nov. 26, 2019, 8 pages.

Konstantinova, et al., "Fingertip Proximity Sensor with Realtime Visual-based Calibration*", Oct. 2016, 6 pages.

White, et al., "EasySnap: Real-time Audio Feedback for Blind Photography", Oct. 2010, pp. 409-410.

"Foreign Office Action", CN Application No. 201980093725.0, Feb. 8, 2024, 15 pages.

"Final Office Action", U.S. Appl. No. 17/439,770, filed Jun. 4, 2024, 17 pages.

\* cited by examiner

CAMERA SYNCHRONIZATION AND IMAGE TAGGING FOR FACE AUTHENTICATION

CROSS-REFERENCE TO RELATED APPLICATION(S)

This application is a national stage entry of International Application No. PCT/US2019/055669, filed Oct. 10, 2019, the disclosure which is incorporated herein by reference in its entirety.

BACKGROUND

Some user equipment (e.g., mobile phones) authenticate a user's face with a multiple-camera system, such as a dual infrared camera. A dual infrared camera alternates between capturing a "flood image" and a "dot image" for each consecutive pair of face authentication frames. A flood illuminator illuminates a user's face while one of the infrared cameras captures a flood image. In the next frame, a dot projector outputs a dot-laser pattern while the other infrared camera takes a "dot image" of the user's face. The dual infrared camera tags metadata of each image to indicate whether each is a flood image or a dot image. Tags are applied consistently by following the alternating rhythm of the image capturing process. A facial recognition model receives an image stream of tagged flood and dot images as input and authenticates the user, e.g., to unlock the user equipment.

The model differentiates between dot and flood images based on metadata tags. Accurately tagging images can be particularly difficult due to dropped frames. A dropped frame occurs when at least one camera fails to capture an image for a frame or captures the image for the frame at an incorrect time. A dropped frame can break the alternating nature of the image-capturing processes which can interrupt tagging and cause images to be tagged incorrectly. Errors or inconsistencies in metadata tags can reduce responsiveness, reliability, and accuracy of a facial recognition model. Inaccurate tags may even cause the facial recognition model to fail, e.g., by performing operations intended for a flood image on a misidentified, dot image. An unpredictable model reduces user satisfaction with face authentication and weakens the security of the user equipment.

SUMMARY

This disclosure describes systems and techniques for synchronizing cameras and tagging images for face authentication. A user equipment (e.g., a mobile phone) initiates a face authentication session by sending a capture command to a control interface of a multiple-camera system. In response, a primary camera outputs a synchronization signal to a secondary camera indicating the start of each frame of the primary camera. The primary camera captures a flood image for an initial frame, and the secondary camera captures a dot image for a subsequent frame, or vice versa (dot then flood); the secondary camera may also capture a flood image for an initial frame and the primary camera may also capture a dot image for the subsequent frame. A "flood identifier" is tagged to the flood image, and a "dot identifier" is tagged to the dot image. The user equipment determines (e.g., based on respective time-stamps of the images) whether the flood and dot images were captured at the correct time during the initial and subsequent frames. If not, the user equipment associates the images with dropped frames. Responsive to determining that neither a flood nor a dot image was taken during a dropped frame, the processor outputs an image stream with the tagged flood and dot images. Conversely, if either the initial or subsequent frame was a dropped frame, images taken during a dropped frame are discarded from the image stream or otherwise prevented from reaching the facial recognition model. The facial recognition model authenticates the user based on an image stream that does not include images associated with dropped frames. Altering an image stream this way prevents some downstream errors during authentication by the model.

The system and techniques, therefore, enable accurate tagging of images for a facial recognition model that relies on the tags to differentiate between flood and dot images. Accurate tagging can be particularly difficult due to dropped frames. Tags are applied sequentially per frame count. If a frame is dropped, the images taken during the dropped frame may show a dot or flood pattern that does not correspond with its tag. A facial recognition model relies on the tags to process images correctly. If an image is tagged as a dot or flood image but shows the opposite dot or flood pattern, the facial recognition model will malfunction executing flood operations on an image with a dot pattern or executing dot operations on an image with a flood pattern. Instead, the system and techniques discard images taken during dropped frames to preserve the alternating nature of the image stream and ensure its accuracy. A more-accurate image stream promotes more efficient computing. The facial recognition model avoids performing operations intended for a flood image on a mistagged dot image. Therefore, the user equipment avoids wasting resources and computing-power that could be applied elsewhere within the user equipment. A more-accurate stream of images also ensures that the model is reliable and not error-prone. Authentications made by the model are accurate because the facial recognition model receives images tagged correctly. A consistently performing model increases user satisfaction with face authentication and strengthens the security of the user equipment.

In some aspects, a method is described for synchronizing cameras and tagging images for face authentication with a facial recognition model. The method includes initiating, by a processor of a user equipment, a face authentication session by sending a capture command to a control interface of a multiple-camera system of the user equipment, and responsive to initiating the face authentication session, outputting, from a first camera of the multiple-camera system and to a second camera of the multiple-camera system, a synchronization signal initiating each frame of the second camera with a start of each frame of the first camera. The method further includes driving, by the first camera, a flood illuminator of the multiple-camera system to capture a flood image of a user for a first frame and automatically tagging metadata of the flood image for the first frame with a flood identifier, and after capturing the flood image for the first frame, driving, by the second camera, a dot projector to capture a dot image of the user for a second frame and automatically tagging metadata of the dot image for the second frame with a dot identifier. Alternatively the first camera may drive the dot projector and the second camera may drive the flood illuminator. The method further includes determining whether the first frame or the second frame is a dropped frame. The method continues by, responsive to determining that neither the first frame or the second frame is a dropped frame, outputting, to the facial recognition model of the user equipment, an image stream comprising the tagged flood image for the first frame and the tagged dot image for the second frame, and authenticating the user by inputting the image stream to the facial recognition model.

This document also describes computer-readable media having instructions for performing the above-summarized method and other methods set forth herein, as well as systems and means for performing these methods.

This summary is provided to introduce simplified concepts for synchronizing cameras and tagging images for face authentication, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of camera synchronization and image tagging for face authentication are described in this document with reference to the following drawings. The same numbers are used throughout the drawings to reference like features and components:

FIGS. 5-1 and 5-2 illustrate example methods of camera synchronization and image tagging for face authentication.

DETAILED DESCRIPTION

Figure 1:
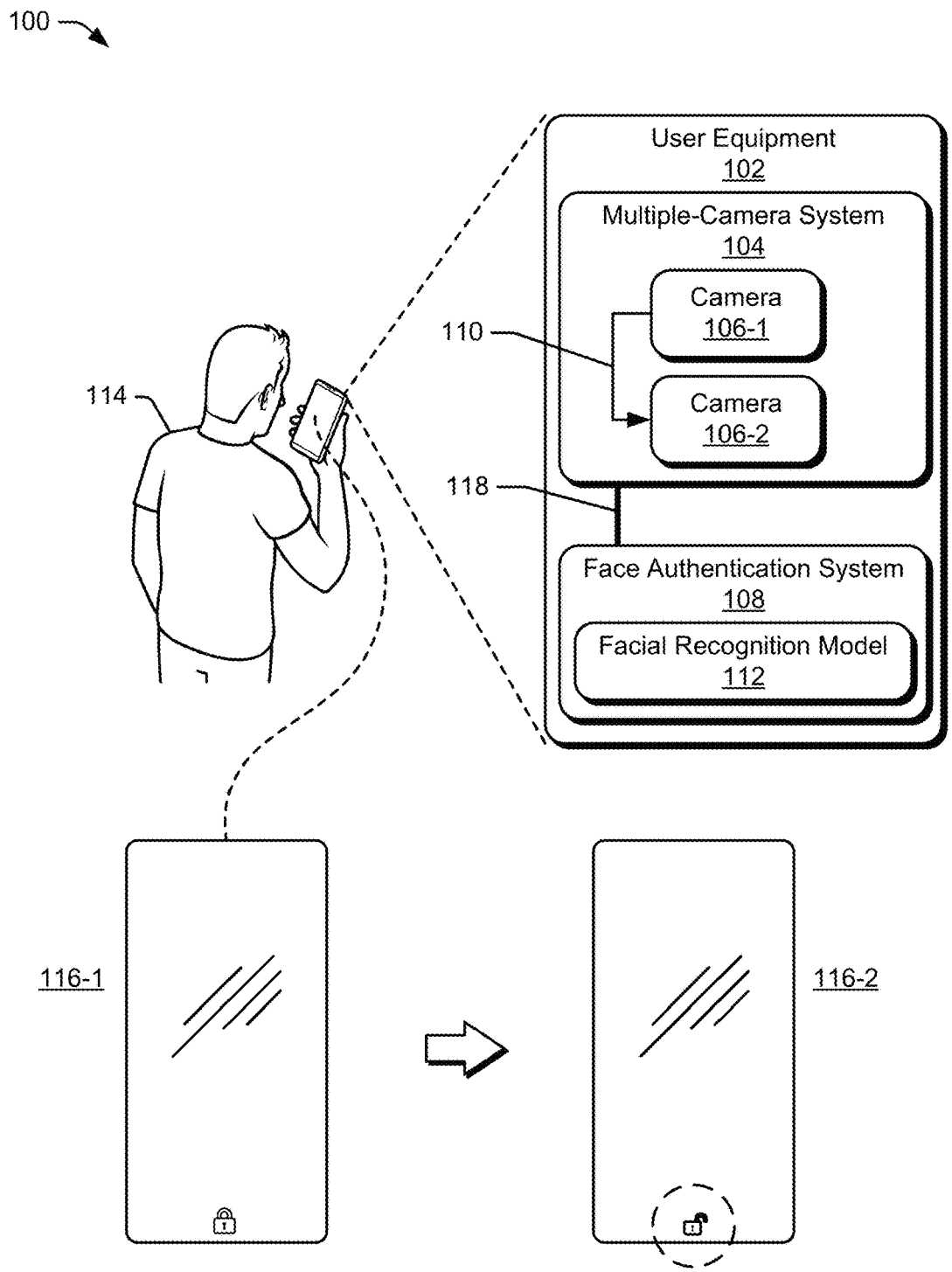
FIG. 1 illustrates an example environment in which techniques for camera synchronization and image tagging for face authentication can be implemented.

This disclosure describes techniques and systems for synchronizing cameras and tagging image frames for face authentication. A face authentication system of a user equipment (e.g., a mobile phone) includes a multiple-camera system. The multiple-camera system is primarily described as a dual infrared camera system however the techniques and systems described herein apply to other types of multiple-camera systems as well, including non-infrared cameras and multiple-camera systems with more than two cameras. While projecting an alternating flood-dot pattern towards a user's face, the dual infrared camera system captures image frames of the face, each showing the face illuminated by the alternating flood-dot pattern.

The alternating flood-dot pattern that appears in the captured image frames is a reference for a facial recognition model (e.g., a machine-learned model trained to authenticate a face of a user). The model authenticates a user's face based on an image stream output from the multiple-camera system. Variations that appear in the stream of images enable inferences to be made by the facial recognition model for generating a three-dimensional map of the user's face. The facial recognition model compares the three-dimensional map to a reference-key (e.g., a predetermined facial-map of an authorized user) and the user equipment authenticates the user if model determines that the map of the user's face sufficiently corresponds with the reference-key.

The model differentiates between the images in the image stream based on metadata tags applied shortly after capturing. A flood image is tagged with one type of metadata tag, and a dot image is tagged with a different type of metadata tag. The tags are applied according to the alternating rhythm of the image capturing process, relying on parity of a frame count to switch between using a flood image tag or dot image tag at the next frame, regardless as to when the images may have actually been taken inside or outside the exposure time allotted for that frame. Accurately tagging images can be particularly difficult due to dropped frames and other timing issues that introduce drift, causing cameras that were synchronized, to take pictures outside an exposure window of a frame. If the metadata of the images in the image stream is incorrectly tagged, the facial recognition model will incorrectly process the pair of images. A flood image that is incorrectly tagged as a dot image causes the model to malfunction because the flood image does not include the necessary dot pattern visible in other dot images.

When the user equipment is overburdened, the multiple-camera system may drop frames. For example, if a processing unit of the user equipment is taxed performing other operations, unrelated to face authentication and image tagging, the processing unit may not have the resources to support driving an image stream with the multiple-camera system, particularly at a capture rate that satisfies the facial recognition model. The techniques and systems described herein enable the user equipment to consistently and accurately tag images to promote accurate facial recognition, despite the occurrence of dropped frames.

As one embodiment, a mobile phone initiates a face authentication session by sending a capture command to a control interface of a multiple-camera system. For example, the multiple-camera system is a front-facing camera system with a field-of-view that projects perpendicular to a touchscreen and towards a user, as the user peers at the touchscreen. The multiple-camera system includes a dual infrared camera and optionally, optical and other additional types of cameras.

The control interface of the multiple-camera system synchronizes initializing and powering of the different cameras. Rather than require a processing unit to issue individual initialization and power-on commands to each camera in the system, the control interface receives a single initialization or power-on command and automatically propagates, in-parallel, the command to each camera of the multiple-camera system. The control interface enables concurrent initialization and powering of the cameras of the multiple-camera system, which aids in the synchronization of the capturing and tagging subsequently performed by the multiple-camera system.

To further synchronize the multiple-camera system, the system is structured to have a primary camera that hardware synchronizes one or more secondary cameras. For example, the primary vertical synchronization (VSYNC) output is hardwired to a VSYNC input of each secondary. In response to receiving a command at the control interface, the primary camera outputs a synchronization signal to the VSYNC input of the secondary camera. The synchronization signal causes each secondary to synchronize the start of each frame with the primary camera. The synchronization signal aligns each pair of cameras per the start of each frame. It may take several frames for cameras to synchronize. The first synchronized frame between the two cameras can be detected by comparing timestamps of primary and secondary images taken with the two cameras.

The primary camera captures a flood image for an initial frame, and the secondary camera captures a dot image for a subsequent frame. A "flood identifier" is tagged to the flood image, and a "dot identifier" is tagged to the dot image.

The processing unit determines (e.g., based on respective time-stamps of the images) whether the flood and dot images were captured at their respective correct times during the initial and subsequent frames. The processing unit associates an image with a dropped frame if the user equipment determines the image was not captured during a particular time window of a frame. Responsive to determining that neither a flood nor a dot image was taken during a dropped frame, the processing unit inputs an image stream with the tagged flood and dot images to the facial recognition model. Conversely, if the processing unit determines that either the initial or subsequent frame was a dropped frame, the processing unit inputs the image stream into the facial recognition model, but with the tagged flood and dot images removed. Images taken during a dropped frame are discarded from the image stream or otherwise prevented from reaching the facial recognition model. In some cases, the flood or dot images are replaced with previously used flood and dot images (e.g., associated with the preceding consecutive two frames). Replacing images rather than outright omitting images from the image stream helps maintain a higher rate of capture expected by the model, by supplying a steady image stream to the model. The facial recognition model authenticates the user based on an image stream that does not include images associated with dropped frames. Altering an image stream this way prevents some downstream errors during authentication by the model.

The user equipment may more accurately tag images than other user equipment that tags images for a facial recognition model that depends on the tags to differentiate between image types. Images taken during dropped frames are discarded to preserve the alternating nature of the image stream and ensure its accuracy. The user equipment avoids wasting resources and computing-power that could be applied elsewhere. Authentications made by the model are accurate because the facial recognition model receives images tagged correctly. A consistently performing model increases user satisfaction with face authentication and strengthens the security of the user equipment.

FIG. 1 illustrates an example environment 100 in which techniques for camera synchronization and image tagging for face authentication can be implemented. The environment 100 includes a user 114 holding a user equipment 102 for face-authenticating the user 114. For example, face-authenticating the user 114 takes the user equipment out of a limited-access state where user interface 116-1 is displayed and grants the user access to a full-access state. In the full-access state, the user equipment displays a user interface 116-2 instead of the user interface 116-1. The user equipment 102 includes a multiple-camera system 104 and a face authentication system 108. The multiple-camera system 104 includes camera 106-1 and camera 106-2 coupled using hardware link 110. The face authentication system 108 includes a facial recognition model 112.

The user equipment 102 (also sometimes referred to as a computing device) may be any type of mobile or non-mobile computing device with a multiple-camera system for face authentication. As a mobile computing device, the user equipment 102 can be a mobile phone, a laptop computer, a wearable device (e.g., watches, eyeglasses, headphones, clothing), a tablet device, an automotive/vehicular device, a portable gaming device, an electronic reader device, or a remote-control device, or other mobile computing device with a camera. As a non-mobile computing device, the user equipment 102 may be a refrigerator, doorbell, thermostat, security system or control pad, a desktop computer, a television device, a display device, an entertainment set-top device, a streaming media device, a tabletop assistant device, a non-portable gaming device, business conferencing equipment, or other non-mobile computing device with a multiple-camera system for face authentication.

The face authentication system 108 represents a collection of hardware, software, and firmware components of the user equipment that coordinate to perform face authentication using the multiple-camera system 104. Various implementations of the authentication system 108 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

For example, the face authentication system 108 includes the facial recognition model 112. A neural network or another type of machine-learned model is an example of the facial recognition model 112. The facial recognition model 112 is trained using machine learning to infer a set of embeddings from an image stream (e.g., an alternating flood-dot image stream) the model 112 receives from the multiple-camera system 104 and in response, output an indication (e.g., a probability, a score) indicating whether the set of embeddings sufficiently correspond to a predetermined reference key. For example, during training, the face authentication system directs the multiple-camera system 104 to capture a variety of images of the user 114 taken from different angles, under different ambient light, etc. and inputs the images into the facial recognition model 112 as training data. The facial recognition model 112 performs inference to generate a reference key, such as a three-dimensional representation of the user's face, that the facial recognition model 112 compares against flood and dot images captured during a face authentication session.

The multiple-camera system 104 is a dual infrared camera system in FIG. 1, meaning each of the two cameras 106-1 and 106-2 is an infrared camera. In other examples, the multiple-camera system 104 can include alternative or additional types of cameras and the techniques and systems described herein for synchronizing and tagging cameras for face authentication equally apply to those other examples. The multiple-camera system 104 treats the camera 106-1 as a "primary camera," and the camera 106-2 as a "secondary camera." The multiple-camera system 104 outputs an alternating stream of flood and dot images to the face authentication system 108, which inputs the alternating stream of images into the facial recognition model 112. The multiple-camera system 104 includes a hardware link 110 that couples a synchronization input of the secondary camera 106-2 to a synchronization output of the primary camera 106-1. The hardware link 110 carries a synchronization signal sent from the primary camera 106-1 to the secondary camera 106-2 to synchronize the secondary camera 106-2 with the primary camera 106-1 at the start of each frame. In this way, the hardware link 110 helps prevent drift and dropped frames by guiding the cameras 106-1 and 106-2 to maintain synchronization from one frame to the next.

To promote synchronization between the cameras 106-1 and 106-2, the face authentication system 108 establishes a common control interface 118 to the multiple-camera system 104. The common control interface 118 simultaneously forwards commands from the face authentication system 108 to the primary camera 106-1 and the secondary camera 106-2. This enables the face authentication system 108 to perform operations (e.g., initialize, stop, start, reset, power) with the cameras 106-1 and 106-2 at approximately the same time. This reduces the delay that could otherwise be introduced into the capturing of flood and dot images. Each camera 106-1 and 106-2 is assigned a unique address on the control interface 118. The face authentication system 108 can send a single capture command that specifies the addresses of the cameras 106-1 and 106-2 that the face authentication system 108 intends to control. The control interface 118 automatically forwards the capture command (e.g., in parallel) to each unique address specified in the command, so each of the cameras 106-1 and 106-2 receives the capture command from the face authentication system 108, at approximately the same time.

As one example for establishing the control interface 118, the face authentication system 108 powers on the primary camera 106-1 first and changes an internal address to be a unique address in the control interface 118. Then, the face authentication system 108 powers on the secondary camera 106-2 and changes an internal address to be a different unique address in the control interface 118. A common stream on the address within the control interface 118 is used to command both cameras 106-1 and 106-2 to start capturing images.

Each image in the alternating stream includes metadata tagged by the face authentication system 108 as indicating either a flood image or a dot image. Tagging the images enables the facial recognition model 112 to discern between the two types of images. The face authentication system 108 can maintain a frame count for a face authentication session. With the alternating nature of the image stream, a parity associated with the frame count (e.g., a bit or flag indicating whether the frame is an odd or even sequentially numbered frame) indicates whether an image should be identified as a flood image or a dot image.

For each pair of frames, the face authentication system 108 determines whether the flood and dot images were captured at their respective correct times during their respective frames. For example, because the cameras 106-1 and 106-2 are hardware and software synchronized, the cameras 106-1 and 106-2 have the same temporal frame of reference. Therefore, time-stamp information applied to the metadata of the images during capture is comparable between cameras 106-1 and 106-2. The face authentication system 108 associates both the flood and dot images with dropped frames if the user equipment 102 determines that one or both images were not captured during an expected time window associated with their respective frame.

The face authentication system 108 improves the accuracy of the tagging of the images in the image stream before the image stream reaches the facial recognition model 112. Because one source of inaccuracies in tags is a dropped frame, a dropped frame breaks the alternating nature of the image stream that other downstream functions (e.g., the tagging function, the facial recognition model 112) depend on. When the user equipment 102 is overburdened, the multiple-camera system 104 may drop frames. For example, the multiple-camera system 104 may not have sufficient resources to drive an image stream at a capture rate that satisfies the facial recognition model 112. Tags are applied sequentially per frame count. If a frame is dropped, the images taken during the dropped frame may show a dot or flood pattern that does not correspond with its tag. The facial recognition model 112 relies on the tags to process images correctly. If an image is tagged as a dot or flood image but shows the opposite dot or flood pattern, the facial recognition model 112 will malfunction executing flood operations on an image with a dot pattern or executing dot operations on an image with a flood pattern. Instead, the techniques and systems described herein enable the user equipment 102 to consistently and accurately tag images to promote accurate facial recognition, despite the occurrence of dropped frames.

Responsive to determining that neither a flood nor a dot image was taken during a dropped frame, the face authentication system 108 inputs the image stream directly into the facial recognition model 112. Conversely, if either a flood or a dot image was captured during a dropped frame, the face authentication system 108 alters the image stream 104 to remove the flood and dot image pair. Images taken during dropped frames are discarded to preserve the alternating nature of the image stream and ensure its accuracy. In some cases, the face authentication system replaces the discarded flood or dot images with previously used flood and dot images (e.g., associated with the preceding consecutive two frames). Replacing images rather than outright omitting images from the image stream helps achieve a rate of capture expected by the facial recognition model 112, by supplying a steady image stream to the facial recognition model 112 without empty frames. This way, the face authentication system 108 ensures the facial recognition model 112 authenticates the user 114 based on an image stream that does not include images associated with dropped frames. Altering an image stream this way prevents some downstream errors during authentication by the facial recognition model 112. The facial recognition model 112 is, therefore, more reliable and responsive.

The user equipment 102 more accurately tags images for a facial recognition model than other user equipment that merely tags images sequentially, and without regard to dropped frames. The user equipment 102 avoids wasting resources and computing-power. Authentications made by the facial recognition model 112 are consistently accurate because the facial recognition model 112 consistently receives images tagged correctly. A regularly performing model 112 increases user satisfaction with the face authentication system 108 and strengthens the security of the user equipment 102.

Figure 2:
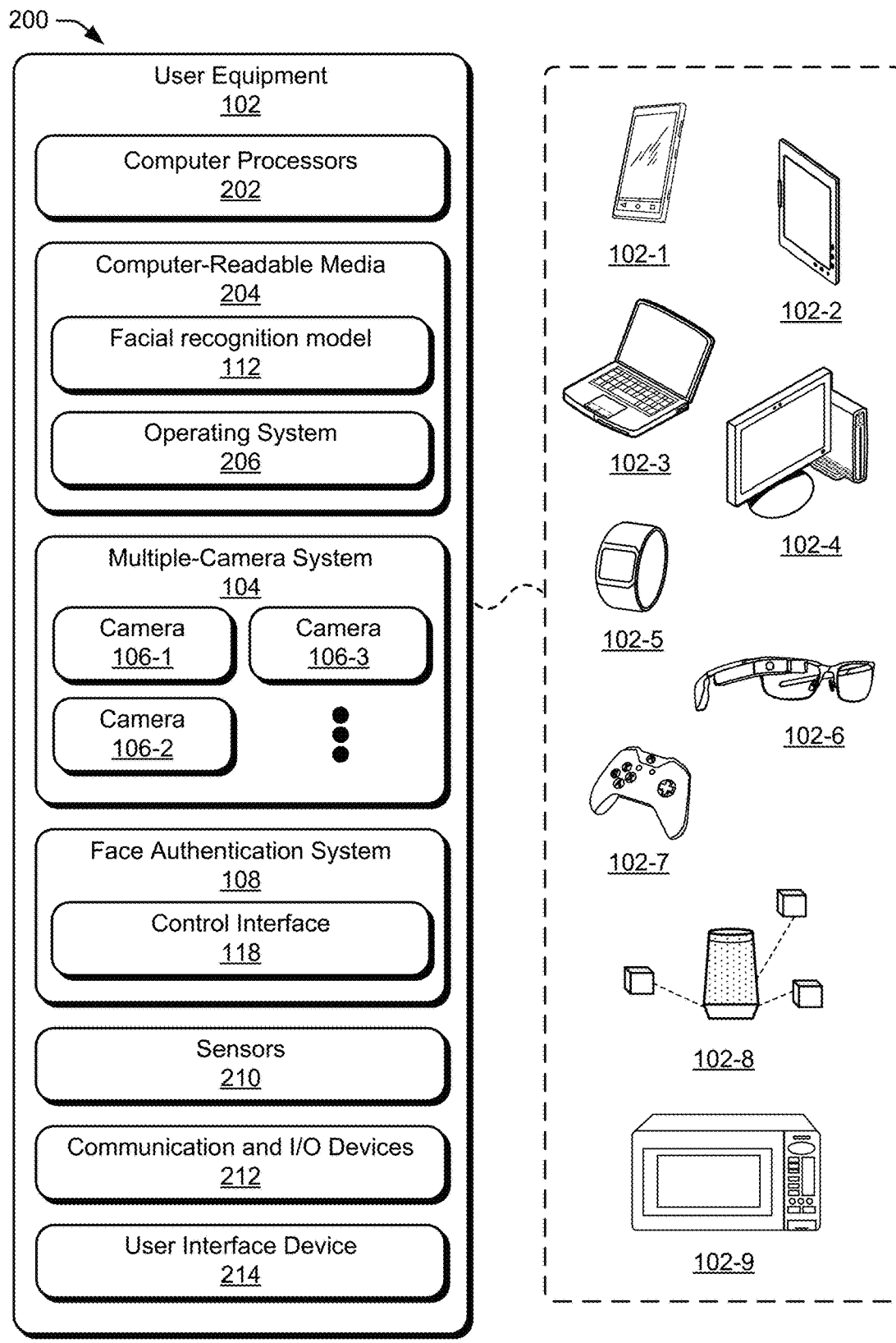
FIG. 2 illustrates an example of the user equipment set forth in FIG. 1.

FIG. 2 illustrates an example 200 of the user equipment 102 set forth in FIG. 1. FIG. 2 shows the user equipment 102 as being a variety of example devices, including a smartphone 102-1, a tablet 102-2, a laptop 102-3, a desktop computer 102-4, a computing watch 102-5, computing eyeglasses 102-6, a gaming system or controller 102-7, a smart speaker system 102-8, and an appliance 102-9. The user equipment 102 can also include other devices, such as televisions, entertainment systems, audio systems, automobiles, drones, trackpads, drawing pads, netbooks, e-readers, home security systems, doorbells, refrigerators, and other devices with multiple cameras and a face authentication system.

The user equipment 102 includes one or more computer processors 202 and one or more computer-readable media 204. The one or more computer-readable media 204 include the face recognition model 112 and an operating system 206. The user equipment 102 further includes the multiple-camera system 104, including the cameras 106-1 and 106-2, as well as an additional camera 106-3. The user equipment 102 further includes the face authentication system 108, one or more sensors 210, one or more communication and input/output (I/O) devices 212, and a user interface device 214, which can operate as an input device and/or an output device.

The processors 202 and the computer-readable media 204, which includes memory media and storage media, are the main processing complex of the user equipment 102. The facial recognition model 112, the operating system 206, and other applications (not shown) can be implemented as computer-readable instructions on the computer-readable media 204, which can be executed by the computer processors 202 to provide functionalities described herein, such as some or all of the functions of the face recognition model 112 (shown within the computer-readable media 204, though this is not required).

The one or more processors 202 may include any combination of one or more controllers, microcontrollers, processors, microprocessors, hardware processors, hardware processing units, digital-signal-processors, graphics processors, graphics processing units, and the like. The processors 202 may be an integrated processor and memory subsystem (e.g., implemented as a "system-on-chip"), which processes computer-executable instructions to control operations of the user equipment 102.

The computer-readable media 204 is configured as persistent and non-persistent storage of executable instructions (e.g., firmware, recovery firmware, software, applications, modules, programs, functions, and the like) and data (e.g., user data, operational data) to support execution of the executable instructions. Examples of the computer-readable media 204 include volatile memory and non-volatile memory, fixed and removable media devices, and any suitable memory device or electronic data storage that maintains executable instructions and supporting data. The computer-readable media 204 can include various implementations of random-access memory (RAM), read-only memory (ROM), flash memory, and other types of storage memory in various memory device configurations. The computer-readable media 204 excludes propagating signals. The computer-readable media 204 may be a solid-state drive (SSD) or a hard disk drive (HDD).

The one or more sensors 210 generally obtain contextual information indicative of operating conditions (virtual or physical) of the user equipment 102 or the user equipment 102's surroundings. The user equipment 102 monitors the operating conditions based in part on sensor data generated by the sensors 210. Examples of the sensors 208 include movement sensors, temperature sensors, position sensors, proximity sensors, light sensors, infrared sensors, moisture sensors, pressure sensors, and the like.

The communication and I/O devices 212 provide connectivity to the user equipment 102 and other devices and peripherals. The communication and I/O devices 212 include data network interfaces that provide connection and/or communication links between the device and other data networks (e.g., a mesh network, external network, etc.), devices, or remote computing systems (e.g., servers). The communication and I/O devices 212 couple the user equipment 102 to a variety of different types of components, peripherals, or accessory devices. Data input ports of the communication and I/O devices 212 receive data, including image data, user inputs, communication data, audio data, video data, and the like. The communication and I/O devices 212 enable wired or wireless communicating of device data between the user equipment 102 and other devices, computing systems, and networks. Transceivers of the communication and I/O devices 212 enable cellular phone communication and other types of network data communication.

The operating system 206 is separate from the facial recognition model 112 in the example shown in FIG. 2. In other examples, the operating system 206 includes the facial recognition model 112. The operating system 206 generally controls functionality of the user equipment 102, including the user interface device 214 and other peripherals such as the communication and I/O device 212. Applications execute within an execution environment provided by the operating system 206. The operating system 206 may schedule tasks and control other general functionality of the user equipment 102. The user interface device 106 manages input and output to the operating system 206 and other applications and services executing at the user equipment 102.

The operating system 206 may drive the user equipment 102 in and out of various operational states. For example, in a limited-access state, the operating system 206 prevents access to various functions or services available to the user 114. In an authenticated state, the operating system 206 opens access to the functions or services previously unavailable to the user 114. The operating system 206 transitions from a limited-access state (e.g., a locked state) to an authenticated state (e.g., an unlocked state) when the face authentication system 108 authenticates the user 114. In other ways, the operating system 206 grants access to the user equipment 102 when the user interface device detects a passcode or password, a voice command, a fingerprint, or a gesture.

The user interface device 214 acts as an output and input component for obtaining user input and providing a user interface. As an output component, the user interface device 214 may be a display, a speaker or audio system, a haptic-feedback system, or another system for outputting information to the user 114. When configured as an input component, the user interface device 214 can include a touchscreen, a camera, a microphone, a physical button or switch, a radar input system, or another system for receiving input from the user 114. Other examples of the user interface device 214 include a mouse, a keyboard, a fingerprint sensor, an optical, an infrared, a pressure-sensitive, a presence-sensitive, or a radar-based gesture detection system. The user interface device 214 often includes a presence-sensitive input component operatively coupled to (or integrated within) a display.

When configured as a presence-sensitive screen, the user interface device 214 detects when the user 114 provides two-dimensional or three-dimensional gestures at or near the locations of a presence-sensitive feature as the user interface 116-1 is displayed. In response to the gestures, the user interface device 214 may output information to other components of the user equipment 102 to indicate relative locations (e.g., X, Y, Z coordinates) of the gestures, and to enable the other components to interpret the gestures. The user interface device 214 may output data based on the information generated by an output component or an input component which, for example, the operating system 206 may use to control the face authentication system 108.

The multiple-camera system 104 includes the camera 106-3, in addition to the cameras 106-1 and 106-2. The face authentication system 108 can synchronize more than two secondary cameras with a primary camera to enable other types of camera-based facial recognition. For example, the facial recognition model 112 may receive a third type of image (e.g., an optical image) and require an image stream of with an alternating pattern of flood image, dot image, and optical image. The camera 106-1 can drive a synchronization input of the camera 106-3 similar to how the camera 106-1 drives the synchronization input of the camera 106-2 to synchronize exposure frame times across the three cameras. The face authentication system 108 can identify dropped frames and omit a triplet of images (e.g., three consecutive frames) from the image stream output to the facial recognition model 112.

Figure 3:
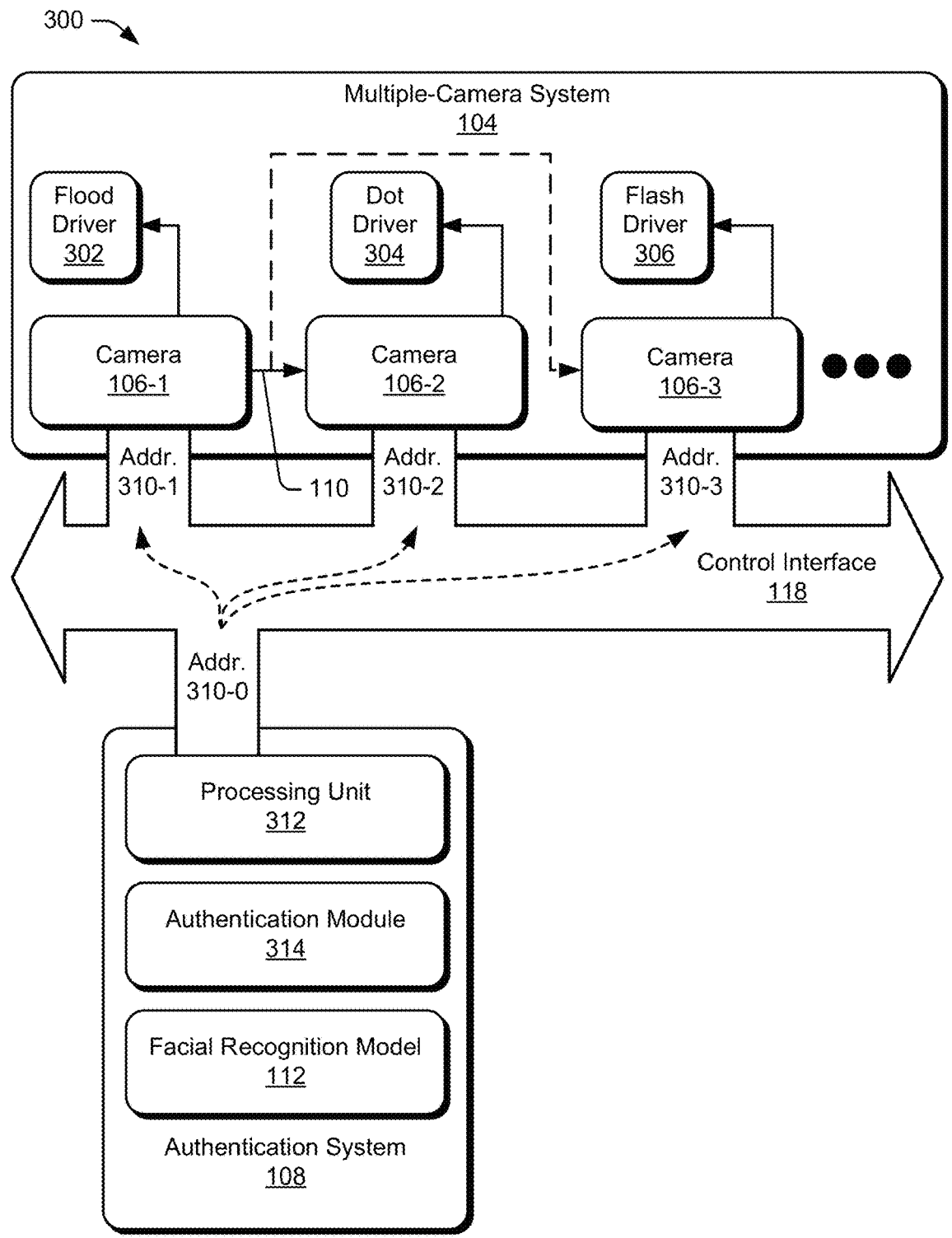
FIG. 3 illustrates further details of the authentication system and the camera system set forth in FIG. 2.

FIG. 3 illustrates further details 300 of the authentication system and the camera system set forth in FIG. 2. Further details 300 illustrated in FIG. 3 include an exploded view of the control interface 118.

The authentication system 108 includes a processing unit 312, authentication module 314, and the facial recognition model 112. The authentication module 314 receives commands from the operating system 206 to initiate a face authentication session and responds to the commands with an indication of whether the face authentication system 108 can authenticate the user 114. A degree of confidence or score may accompany the indication of whether the user 114 is authenticated.

The control interface 118 includes unique address spaces 310-1, 310-2, and 310-3 for each of the cameras 106-1, 106-2, and 106-3 (as well as any other camera of the multiple-camera system 104 that is not shown). The processing unit 312 (e.g., similar to the processors 202) has a unique address space 310-0 to send and receive commands to the cameras 106-1 through 106-3 on behalf of an authentication module 314. The control interface 118 may be an inter-integrated circuit (I²C) or another similar interface that enables the simultaneous transmission of a command from a common processor, such as the processing unit 312, to multiple cameras at once. An inter-integrated circuit is used to connect lower-speed peripherals (e.g., infrared cameras) to faster-speed processors in short-distance. The processing unit 312 can output a command to the control interface 118 that is propagated to the addresses 310-1 and 310-2 at around the same time, so the cameras 106-1 and 106-2 are software synchronized. The cameras 106-1 and 106-2 are hardware synchronized by the link 110 which may optionally connect to a synchronization input of the camera 106-3.

The camera 106-1 drives a flood driver 302 of a flood illuminator to take a flood image during an initial frame of a face authentication session. A dot driver 304 of a dot projector outputs a dot pattern during a subsequent frame of the face authentication session when the camera 106-2 drives the dot driver 304 to take a dot image. The camera 106-3 operates a flash driver 306 to drive a flash and capture an optical image.

Figure 4:
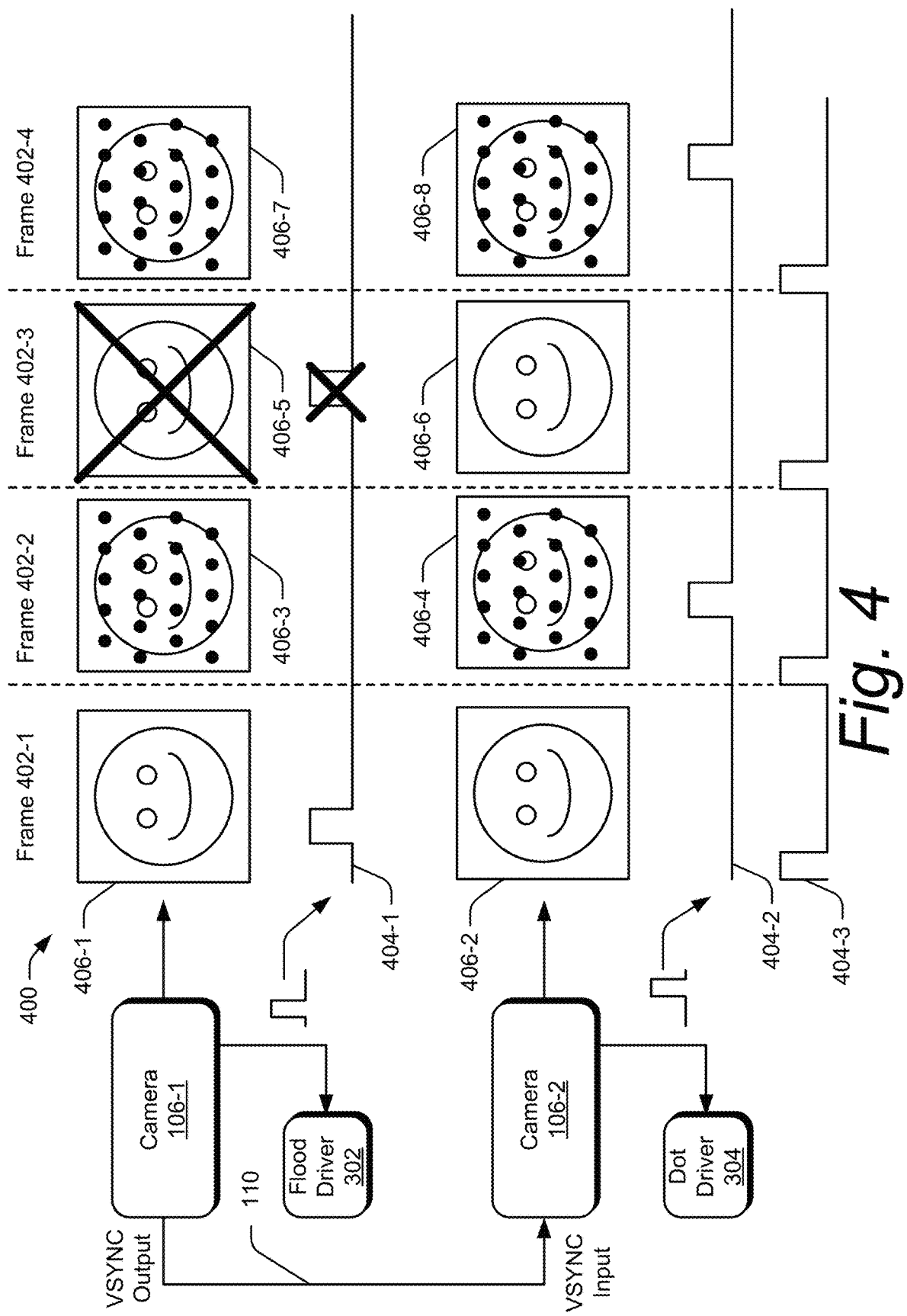
FIG. 4 illustrates an example of a frame-sequence captured by the camera system set forth in FIG. 3.

FIG. 4 illustrates an example of a frame-sequence 400 captured by the multiple-camera system 104 set forth in FIG. 3. The frame-sequence 400 is divided into four equal frames 402-1 through 402-4. The cameras 106-1 and 106-2 are synchronized according to frames by a vertical synchronization signal 110.

During the frame 402-1, the flood driver 302 receives input 404-1, causing a flood projector to illuminate while the cameras 106-1 and 106-2 capture images 406-1 and 406-2, respectively. The image 406-1 is a primary flood image, and the image 406-2 is a secondary flood image. In some examples, the secondary image is discarded however in other cases, a facial recognition model uses both the primary and secondary images 406-1 and 406-2 for each frame 402-1 through 402-4, to authenticate the user 114. During the frame 402-2, the camera 106-2 controls the dot driver 304 to project a laser dot pattern with a dot projector while the cameras 106-1 and 106-2 capture images 406-3 and 406-4, respectively. The image 406-3 is a primary dot image, and the image 406-4 is a secondary dot image.

The process repeats in frames 402-3 and 402-4 however as will be made clear below, frame 402-3 includes a dropped frame. The flood driver 302 commands the flood illuminator to turn on while a primary flood image 406-5 and secondary flood image 406-6 are captured during the frames 403-3 and 402-4. In the frame 402-4, a primary dot image 406-7 and secondary dot image 406-8 are captured as the dot driver 304 controls the dot projector to turn on.

The authentication module 324 tags the metadata of the images 406-1 and 406-2 with flood identifiers and tags the metadata of the images 406-3 and 406-4 with dot identifiers, before inputting them into the facial recognition model 112. The identifier selected for each image tag can be derived based on a frame count maintained by the authentication module 324. For example, even frames are for capturing the primary and secondary flood images, and the odd frames are for capturing the primary and secondary dot images.

The authentication module 324 tags the metadata of the images 406-5 and 406-6 with a flood identifier and tags the metadata of the images 406-7 and 406-8 with a dot identifier. However, before inputting the images 406-5 through 406-8 into the image stream and into the facial recognition model 112, the authentication module 314 determines that the frame 402-3 is a dropped frame. For example, timestamp data of the flood image 406-5 may be different than timestamp data of the flood image 406-6, which may indicate that either image 406-5 was captured at an incorrect time during the frame 402-3. If the timestamp is outside a time window for the frame 402-3, for example, the authentication module 314 will treat the frame 402-3 as a dropped frame.

To preserve the alternating nature of the tagging of the image stream input to the facial recognition model 112, the authentication module 314 omits the images 406-5 and 406-6 as well as the images 406-7 and 406-8 because the images 406-7 and 406-8 are from a paired next frame. Each dropped frame is expanded to include a previous or subsequent frame. So if a flood image is captured during a dropped frame, the authentication module 314 treats the frame in which a corresponding dot image is captured as also being a dropped frame.

Figures 1, 5:
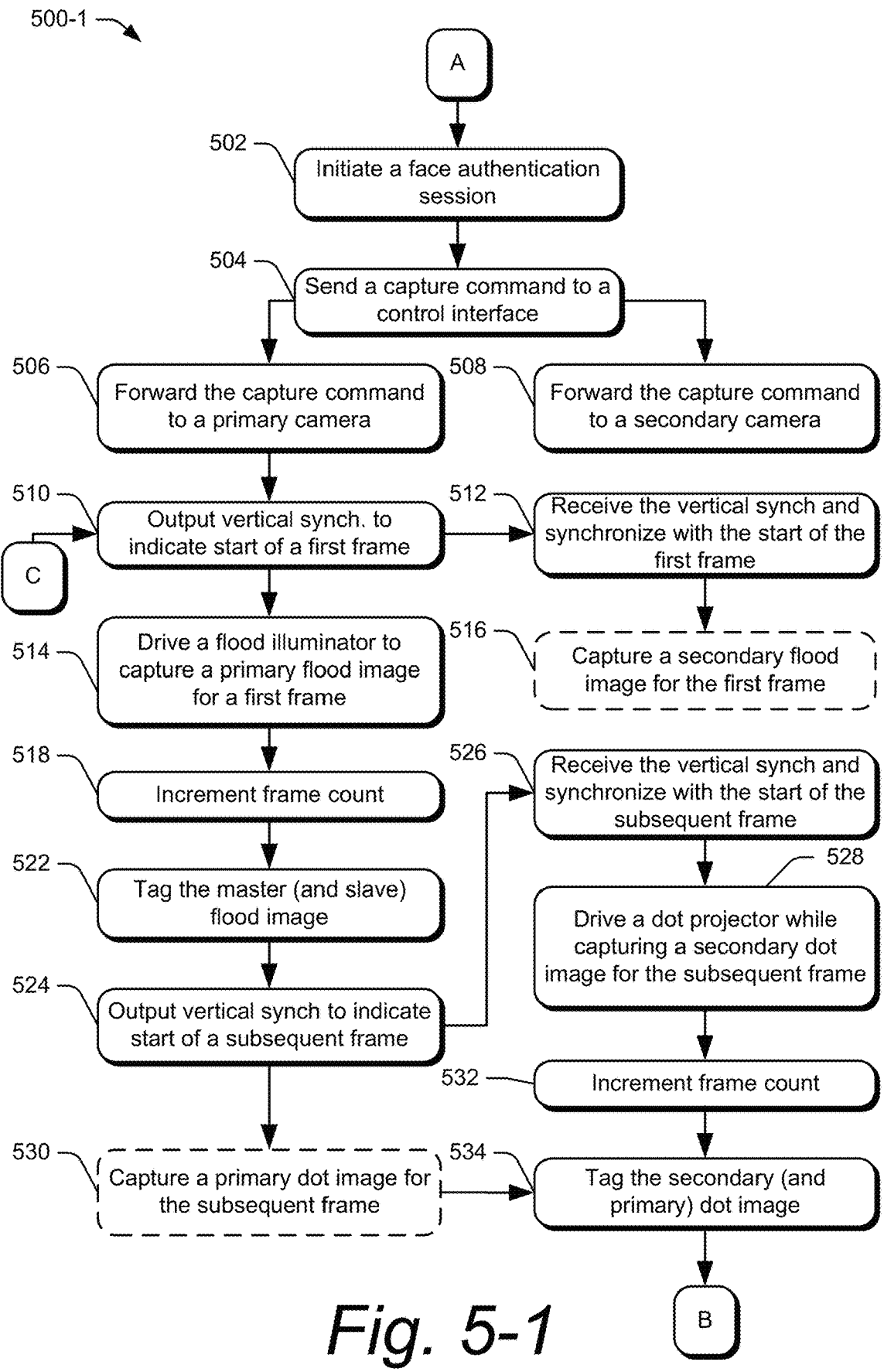
Figures 2, 5:
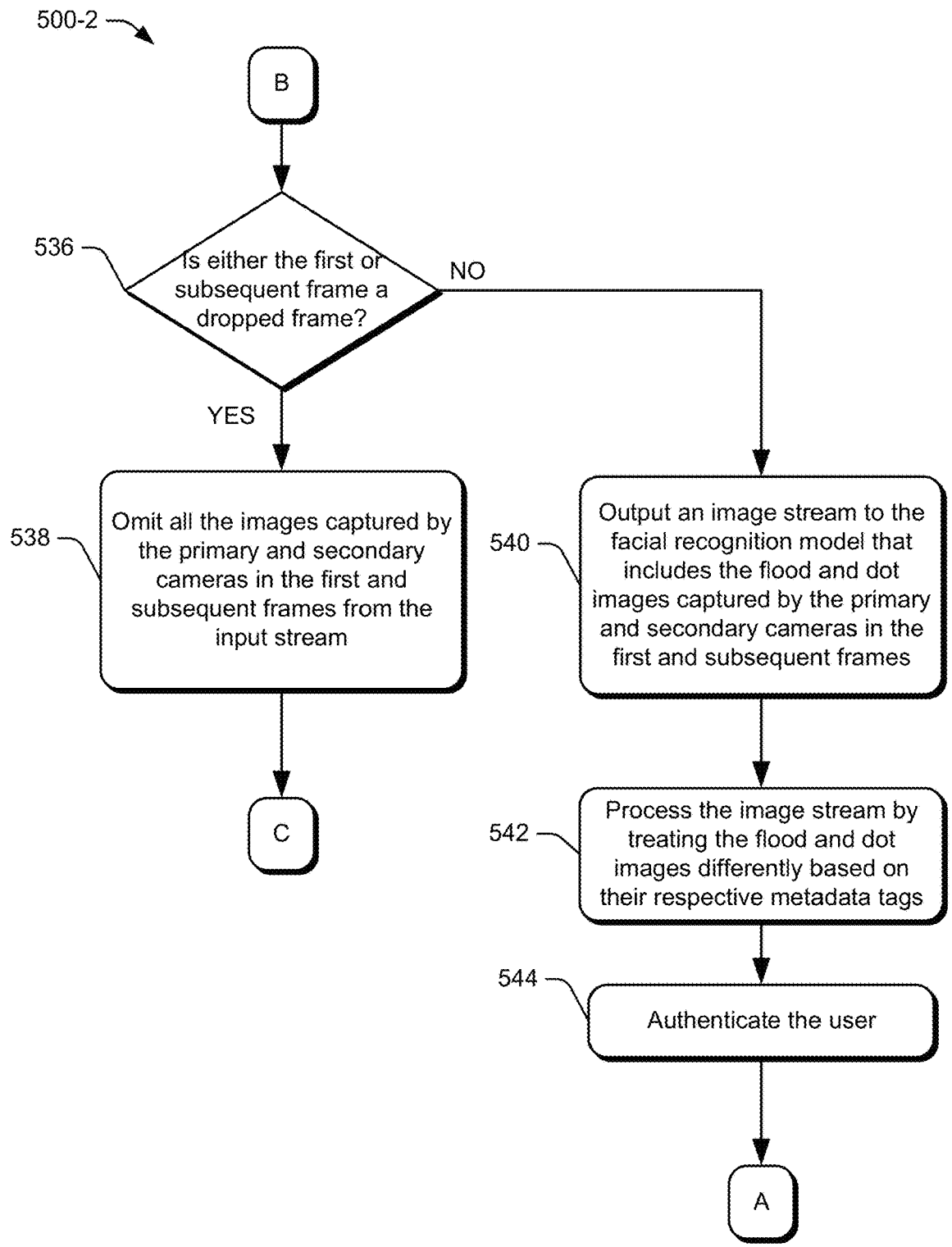

FIGS. 5-1 and 5-2 illustrate example methods of camera synchronization and image tagging for face authentication. The methods 500-1 and 500-2 can include additional or fewer steps than those shown in FIGS. 5-1 and 5-2, and may be performed in a different order. The methods 500-1 and 500-2 are described below in the context of user equipment 102.

At 502, the user equipment 102 initiates a face authentication session. For example, the user 114, while holding the user equipment 102 looks at the user interface 116-1 to unlock the user equipment and gain access to the user interface 116-2. The operating system 206 may wake up the face authentication system 108. At 504, the face authentication system 108 sends a capture command to the control interface 118 of the multiple-camera system 104. At 506, the control interface 118 forwards the capture command to a unique address 310-1 associated with the primary camera 106-1. At around the same time as 506, at 508, the control interface 118 forwards the capture command to a unique address 310-2 associated with the secondary camera 106-2. The primary camera 106-1 and the secondary camera 106-2 power on.

At 510, the primary camera 106-1 outputs a vertical synchronization signal over the link 110 to indicate the start of a first frame, and at 512, the secondary camera 106-2 receives the vertical synchronization signal and synchronizes with the start of the first frame as indicated by the primary camera 106-1. The vertical synchronization signal synchronizes the secondary camera 106-2 with the start of each frame of the face authentication session. The link between the primary camera 106-1 and the secondary camera 106-2 in some examples couples a synchronization input of the secondary camera 106-2 to a synchronization output of the primary camera 106-1.

At 514, the primary camera 106-1 drives a flood illuminator of the multiple-camera system 104 to capture a primary flood image of the user 114 for the first frame. At 516, while driving the flood illuminator to capture the primary flood image for the first frame and in response to receiving the synchronization signal, the secondary camera 106-2 captures a secondary flood image for the first frame.

At 518, the face authentication system 108 increments a frame count maintained for the face authentication session and after having completed the first frame. At 522, the face authentication system 108 automatically tags the primary and secondary flood images. For example, the face authentication system 108 determines a parity value of the frame count and based on the parity value being zero to indicate an even frame, the face authentication system 108 selects a flood identifier instead of a dot identifier to tag the images in the first frame.

At 524, the primary camera 106-1 outputs a vertical synchronization signal over the link 110 to indicate the start of a subsequent frame, and at 526, the secondary camera 106-2 receives the vertical synchronization signal and synchronizes with the start of the subsequent frame initiated by the primary camera 106-1.

At 528, the secondary camera 106-2 drives a dot projector of the multiple-camera system 104 while capturing a secondary dot image of the user 114 for the subsequent frame. At 530, while driving the dot projector to capture the secondary dot image for the subsequent frame, the primary camera 106-1 (optionally) captures a primary dot image for the subsequent frame.

At 532, the face authentication system 108 increments the frame count. At 534, the face authentication system 108 automatically tags the primary and secondary dot images. For example, the face authentication system 108 determines the parity value of the frame count and based on the parity value being one to indicate an odd frame, the face authentication system 108 selects a dot identifier instead of a flood identifier to tag the images in the second frame.

At 536, to ensure an accurate input stream to the facial recognition model 112, the face authentication system 108 determines whether either the first or subsequent frames is a dropped frame. For example, based on time stamping information, error messages returned from the cameras 106-1 or 106-2, or other information, the face authentication system 108 determines whether any of the primary or secondary images taken in the two frames were taken at an incorrect time.

At 540, responsive to determining that neither the first frame nor the subsequent frame is a dropped frame, the face authentication system 108 outputs an image stream to the facial recognition model 112 that includes the flood and dot images captured by the cameras 106-1 and 106-2 in the first and subsequent frames, for example, at least the primary tagged flood image for the first frame and the secondary tagged dot image for the subsequent frame. In some cases, the image stream also includes the secondary tagged flood image and the primary tagged dot image.

At 542, the image recognition model 112 processes the image stream by treating the flood and dot images differently based on their respective metadata tags. At 544, the facial recognition model 112 authenticates the user, for example, outputting an indication of whether the image stream matches a reference key. At 538, in the alternative to 540, in response to detecting a dropped frame during the face authentication session, the face authentication system 108 omits all the images taken in the two consecutive frames from the image stream.

The following are additional examples of the described systems and techniques for synchronizing cameras and tagging images for face authentication.

Example 1. A method for synchronizing cameras and tagging images for face authentication with a facial recognition model, the method comprising: initiating, by a face authentication system of a user equipment, a face authentication session by sending a capture command to a control interface of a multiple-camera system; responsive to initiating the face authentication session, outputting, from a first camera of the multiple-camera system and to a second camera of the multiple-camera system, a vertical synchronization signal synchronizing the secondary camera with a start of each frame of the face authentication session; driving, by the first camera of the multiple-camera system, a flood illuminator of the multiple-camera system to capture a flood image of a user for a first frame and automatically tagging metadata of the flood image for the first frame with a flood identifier; after capturing the flood image for the first frame, driving, by the second camera of the multiple-camera system, a dot projector to capture a dot image of the user for a second frame and automatically tagging metadata of the dot image for the second frame with a dot identifier; determining whether the first frame or the second frame is a dropped frame; responsive to determining that neither the first frame or the second frame is a dropped frame, outputting, to the facial recognition model of the user equipment, an image stream comprising the tagged flood image for the first frame and the tagged dot image for the second frame; and authenticating, by the facial recognition model and based on the image stream, the user.

Example 2. The method of example 1, further comprising: driving, by the first camera, the flood illuminator to capture a flood image for a third frame, the third frame following the second frame; after capturing the flood image for the third frame, driving, by the second camera, the dot projector to capture a dot image for a fourth frame; detecting a dropped frame during the capturing of the flood image for the third frame or a dropped frame during capturing of the dot image for the fourth frame; and responsive to detecting the dropped frame during the capturing of the flood image for the third frame or the dropped frame during capturing of the dot image for the fourth frame, omitting both the flood image for the third frame and the dot image for the fourth frame from the image stream.

Example 3. The method of example 1 or 2, wherein sending the capture command to the control interface comprises: forwarding the capture command to a unique address in the control interface associated with the first camera; and forwarding the capture command to a unique address in the control interface associated with the second camera.

Example 4. The method of any of examples 1-3, wherein outputting the synchronization signal comprises outputting the synchronization signal from the first camera to the second camera over a link between the first camera and the second camera, wherein the link couples a synchronization input of the second camera to a synchronization output of the first camera.

Example 5. The method of any of examples 1-4 wherein the flood image is a first flood image for the first frame, the method further comprising: while driving the flood illuminator to capture the first flood image for the first frame and in response to receiving the synchronization signal, capturing, with the second camera, a second flood image for the first frame; automatically tagging metadata of the second flood image for the first frame with the flood identifier; and outputting the second flood image for the first frame with the image stream for authenticating the user.

Example 6. The method of any of examples 1-4 wherein the dot image is a second dot image for the second frame, the method further comprising: while driving the dot projector to capture the second dot image for the second frame and in response to receiving the synchronization signal, capturing, with the first camera, a first dot image for the second frame; automatically tagging metadata of the first dot image for the second frame with the dot identifier; and outputting the first dot image for the second frame with the image stream for authenticating the user.

Example 7. The method of any of examples 1-4, wherein automatically tagging the metadata of the flood image for the first frame and automatically tagging the metadata of the dot image for the second frame comprises: maintaining a frame count for the face authentication session; determining a first parity value of the frame count during the first frame; selecting, based on the first parity value, a flood identifier instead of a dot identifier; determining a second parity value of the frame count during the second frame; and selecting, based on the second parity value, a dot identifier instead of a flood identifier;

Example 8. The method of any of examples 1-4, or 7, wherein the facial recognition model comprises a machine-learned model trained to authenticate the user based on the image stream.

Example 9. The method of example 8, wherein authenticating the user based on the image stream comprises determining, by the machine-learned model, based on the metadata tagged to the flood image for the first frame, that the flood image for the first frame is a flood image and not a dot image.

Example 10. The method of any one of examples 1-9, wherein the first camera is a primary camera and the second camera is a secondary camera.

Example 11. A user equipment comprising: a face authentication system comprising a processing unit and a memory; a multiple-camera system comprising a first camera and a second camera, the multiple-camera system being configured to output an alternating stream of flood and dot images, each image in the alternating stream including metadata tagged as either a flood image or a dot image; a common control interface that simultaneously forwards commands from the processing unit to the first camera and the second camera, each of the first camera and the second camera comprising a unique address in the common control interface; and a link that couples a synchronization input of the second camera to a synchronization output of the first camera to send a synchronization signal from the first camera to the second camera to initiate each frame of the second camera with a start of each corresponding frame of the first camera, the memory of the face authentication system comprising instructions, that when executed by the processing unit, cause the processing unit to: execute a facial recognition model that receives the alternating stream output from the multiple-camera system and determines whether each image in the alternating stream is either a flood image or a dot image based on the metadata of each image in the alternating stream; and using the facial recognition model, authenticate the user based on the alternating stream.

Example 12. The user equipment of example 11, wherein the instructions, when executed, further cause the processing unit to detect a dropped frame, and wherein the multiple-camera system is configured to discard each image captured by the multiple-camera system during the dropped frame by omitting each image captured during the dropped frame from the alternating stream.

Example 13. The user equipment of examples 11 or 12, wherein the instructions, when executed, further cause the processing unit to initiate a face authentication session with the facial recognition model by: assigning a first unique address on the control interface to the first camera; assigning a second unique address on the control interface to the second camera; and sending a single capture command to the control interface where the single capture command is automatically forwarded to each of the first unique addresses of the first camera and the second unique address of the second camera.

Example 14. The user equipment of any of examples 11-13, wherein the multiple-camera system is a dual infrared camera system, and the first camera is the same type of infrared camera as the second camera.

Example 15. A computer-readable storage medium comprising instructions that, when executed, configure at least one processor of a user equipment to perform any one of the methods of examples 1-10.

While various embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method for synchronizing cameras and tagging images for face authentication with a facial recognition model, the method comprising:
    initiating, by a face authentication system of a user equipment, a face authentication session by sending a capture command to a control interface of a multiple-camera system;
    responsive to initiating the face authentication session, outputting, from a first camera of the multiple-camera system and to a second camera of the multiple-camera system, a vertical synchronization signal synchronizing the second camera with a start of each frame of the face authentication session;
    driving, by the first camera of the multiple-camera system, a flood illuminator to capture a first flood image of a user for a first frame;
    after capturing the flood image for the first frame, driving, by the second camera of the multiple-camera system, a dot projector to capture a first dot image of the user for a second frame;
    driving, by the first camera of the multiple-camera system, the flood illuminator to capture a second flood image for a third frame, the third frame following the second frame;
    after capturing the second flood image for the third frame, driving, by the second camera of the multiple-camera system, the dot projector to capture a second dot image for a fourth frame;
    creating an image stream comprising:
        a first frame pair comprising the first frame and the second frame; and
        a second frame pair comprising the third frame and the fourth frame;
    detecting a dropped frame, the dropped frame being any one of the first, second, third, or fourth frame;
    responsive to detecting the dropped frame, omitting the frame pair containing the dropped frame from the image stream;
    outputting, to the facial recognition model of the user equipment, the image stream; and
    authenticating, by the facial recognition model and based on the image stream, the user.

2. The method of claim 1, wherein sending the capture command to the control interface comprises:
forwarding the capture command to a unique address in the control interface associated with the first camera; and
forwarding the capture command to a unique address in the control interface associated with the second camera.

3. The method of claim 1, wherein outputting the synchronization signal comprises outputting the synchronization signal from the first camera to the second camera over a link between the first camera and the second camera, wherein the link couples a synchronization input of the second camera to a synchronization output of the first camera.

4. The method of claim 1, the method further comprising:
while driving the flood illuminator to capture the first flood image for the first frame and in response to receiving the synchronization signal, capturing, with the second camera, a third flood image for the first frame;
automatically tagging metadata of the first flood image for the first frame with a flood identifier;
automatically tagging metadata of the third flood image for the first frame with the flood identifier;
outputting the third flood image for the first frame with the image stream for authenticating the user;
while driving the dot projector to capture the second dot image for the second frame and in response to receiving the synchronization signal, capturing, with the first camera, a third dot image for the second frame;
automatically tagging metadata of the first dot image for the second frame with a dot identifier;
automatically tagging metadata of the third dot image for the second frame with the dot identifier; and
outputting the third dot image for the second frame with the image stream for authenticating the user.

5. The method of claim 4, wherein automatically tagging the metadata of the first flood image for the first frame and automatically tagging the metadata of the first dot image for the second frame comprises:
maintaining a frame count for the face authentication session;
determining a first parity value of the frame count during the first frame;
selecting, based on the first parity value, a flood identifier instead of a dot identifier;
determining a second parity value of the frame count during the second frame; and
selecting, based on the second parity value, a dot identifier instead of a flood identifier.

6. The method of claim 4, wherein the detecting of the dropped frame comprises determining that a metadata for the dropped frame does not match a type of image for the dropped frame.

7. The method of claim 1, wherein the facial recognition model comprises a machine-learned model trained to authenticate the user based on the image stream.

8. The method of claim 7, wherein authenticating the user based on the image stream comprises determining, by the machine-learned model, based on a metadata tagged to the first flood image for the first frame, that the first flood image for the first frame is a flood image and not a dot image.

9. The method of claim 1, wherein the first camera is a primary camera and the second camera is a secondary camera.

10. The method of claim 1, wherein the detecting of the dropped frame comprises determining that the image associated with the dropped frame was captured outside of a time window.

11. A user equipment comprising:
a face authentication system comprising a processing unit and a memory;
a multiple-camera system comprising a first camera and a second camera, the multiple-camera system being configured to output an alternating stream of image pairs of flood and dot images, each image in the alternating stream including metadata tagged as either a flood image or a dot image;
a common control interface that simultaneously forwards commands from the processing unit to the first camera and the second camera, each of the first camera and the second camera comprising a unique address in the common control interface; and
a link that couples a synchronization input of the second camera to a synchronization output of the first camera to send a synchronization signal from the first camera to the second camera to initiate each frame of the second camera with a start of each corresponding frame of the first camera,
the memory of the face authentication system comprising instructions, that when executed by the processing unit, cause the processing unit to:
execute a facial recognition model that receives the alternating stream output from the multiple-camera system and determines whether each image in the alternating stream of image pairs is either a flood image or a dot image based on the metadata of each image in the alternating stream;
detect a dropped frame;
discard the image pair associated with the dropped frame from the alternating stream; and
using the facial recognition model, authenticate the user based on the alternating stream.

12. The user equipment of claim 11, wherein the instructions, when executed, further cause the processing unit to initiate a face authentication session with the facial recognition model by:
assigning a first unique address on the control interface to the first camera;
assigning a second unique address on the control interface to the second camera; and
sending a single capture command to the control interface where the single capture command is automatically forwarded to each of the first unique addresses of the first camera and the second unique address of the second camera.

13. The user equipment of claim 11, wherein the multiple-camera system is a dual infrared camera system, and the first camera is the same type of infrared camera as the second camera.

14. The user equipment of claim 11, wherein the detection of the dropped frame comprises a determination that the image associated with the dropped frame was captured outside of a time window.

15. A non-transitory computer-readable storage medium comprising instructions that, when executed, configure at least one processor of a user equipment to:
send a capture command to a control interface of a multiple-camera system to initiate, by a face authentication system of the user equipment, a face authentication session;

responsive to the initiation of the face authentication session, output, from a first camera of the multiple-camera system and to a second camera of the multiple-camera system, a vertical synchronization signal to synchronize the second camera with a start of each frame of the face authentication session;

drive, by the first camera of the multiple-camera system, a flood illuminator to capture a first flood image of a user for a first frame;

after capture of the first flood image for the first frame, drive, by the second camera of the multiple-camera system, a dot projector to capture a first dot image of the user for a second frame;

drive, by the first camera of the multiple-camera system, the flood illuminator to capture a second flood image for a third frame, the third frame following the second frame;

after capture the second flood image for the third frame, drive, by the second camera of the multiple-camera system, the dot projector to capture a second dot image for a fourth frame;

create an image stream comprising:
  a first frame pair comprising the first frame and the second frame; and
  a second frame pair comprising the third frame and the fourth frame;

detect a dropped frame, the dropped frame being any one of the first, second, third, or fourth frame;

responsive to the detection of the dropped frame, omit the frame pair containing the dropped frame from the image stream;

output, to a facial recognition model of the user equipment, the image stream; and authenticate, by the facial recognition model and based on the image stream, the user.

16. The non-transitory computer-readable storage medium of claim 15, wherein the instructions, when executed, further configure the processor to send the capture command to the control interface by at least:
  forward the capture command to a unique address in the control interface associated with the first camera; and
  forward the capture command to a unique address in the control interface associated with the second camera.

17. The non-transitory computer-readable storage medium of claim 15, wherein the instructions, when executed, configure the processor to output the synchronization signal by at least:
  output the synchronization signal from the first camera to the second camera over a link between the first camera and the second camera, wherein the link couples a synchronization input of the second camera to a synchronization output of the first camera.

18. The non-transitory computer-readable storage medium of claim 15, wherein the instructions, when executed, further configure the processor to:
  while the flood illuminator is driven to capture the first flood image for the first frame and in response to receipt of the synchronization signal, capture, with the second camera, a third flood image for the first frame;
  automatically tag metadata of the first flood image for the first frame with a flood identifier;
  automatically tag metadata of the third flood image for the first frame with the flood identifier;
  while the dot projector is driven to capture the second dot image for the second frame and in response to receipt of the synchronization signal, capture, with the first camera, a third dot image for the second frame;
  automatically tag metadata of the first dot image for the second frame with a dot identifier;
  automatically tag metadata of the third dot image for the second frame with the dot identifier; and
  output the image stream for authenticating the user.

19. The non-transitory computer-readable storage medium of claim 15, wherein the detection of the dropped frame comprises a determination that the image associated with the dropped frame was captured outside of a time window.

* * * * *